United States Patent [19]

Hikmet et al.

[11] Patent Number: 5,188,760
[45] Date of Patent: Feb. 23, 1993

[54] LIQUID CRYSTALLINE MATERIAL AND DISPLAY CELL CONTAINING SAID MATERIAL

[75] Inventors: Rifat A. M. Hikmet, Eindhoven, Netherlands; Dirk J. Broer, Wilmington, Del.

[73] Assignee: U. S. Philips Corporation, New York, N.Y.

[21] Appl. No.: 679,981

[22] Filed: Apr. 3, 1991

[30] Foreign Application Priority Data

Apr. 6, 1990 [NL] Netherlands .................. 9000808

[51] Int. Cl.⁵ .................. C09K 19/52; C09K 19/12; C09K 19/20; C09K 19/22
[52] U.S. Cl. .................. 252/299.01; 252/299.66; 252/299.67; 252/299.68
[58] Field of Search .................. 252/299.01, 299.67, 252/299.66, 299.68

[56] References Cited

U.S. PATENT DOCUMENTS

| 4,722,595 | 2/1988 | Siol | 350/353 |
| 4,925,589 | 5/1990 | Lorenz | 252/299.01 |
| 4,994,204 | 2/1991 | Doane et al. | 252/299.01 |

FOREIGN PATENT DOCUMENTS 2-086692  3/1990  Japan .

OTHER PUBLICATIONS

Chem. Abstracts: 113: 60386S.
Chem. Abstracts: 114:229493h.
Chemical Abstracts: 114:32025a.

*Primary Examiner*—Robert L. Stoll
*Assistant Examiner*—C. Harris
*Attorney, Agent, or Firm*—Norman N. Spain

[57] ABSTRACT

A liquid crystalline material in the form of an anisotropic gel comprising a polymerized liquid crystalline material and a low-molecular weight liquid crystalline material, can be used in a display cell, said polymerized material forming a permanently oriented network in the low-molecular weight liquid crystalline material.

24 Claims, 2 Drawing Sheets

LIQUID CRYSTALLINE MATERIAL AND DISPLAY CELL CONTAINING SAID MATERIAL

BACKGROUND OF THE INVENTION

The invention relates to a liquid crystalline material in the form of an anisotropic gel comprising a polymerized liquid crystalline material and a low-molecular weight liquid crystalline material. The invention further relates to a display cell comprising two facing plates which are transparent to light, which plates are provided on the sides facing each other with an electrode of a material which is also transparent to light, each electrode carrying a transparent orientation layer, a sealing material which is in the form of, for example, a ring, between the plates and, a liquid-crystalline material in the space between the plates and the sealing material.

In WO89/09807, a material is disclosed which consists of microdrops of a liquid crystalline material dispersed in a polymeric matrix of a liquid crystalline material having mesogenic groups. In said publication it is stated that the matrix material is of the thermoplastic type, indicating linear polymers. Said linear polymers can be used in electro-optical light shutters because, dependent upon the structure of the microdrops and the configuration of light shutter, said light shutters are bistable for example, translucent in the OFF-state and opaque in the ON state.

In WO89/06371, a composite material is disclosed which consists of drops of liquid crystalline material within a matrix of a polymer of acrylic acid, said liquid crystalline material having a solubility in the polymer which is lower than its solubility in the corresponding monomer. After polymerization of the monomer, this composite material is a solid matrix in which the liquid crystalline material is dispersed in the form of drops. In this manner, problems concerning the leaking of the liquid material from the display cells are overcome. In U.S. Pat. No. 4,891,152, a similar material is disclosed, with the difference that a matrix is formed from a copolymer of an acrylate and a mercaptan.

In European Patent Application EP 291427, a description is given of a polymer of a liquid crystalline material having mesogenic groups in the side chain and an ethene-like unsaturation. These linear polymers may be mixed with variable quantities of small molecules which have no side chains, which small molecules may be mesogenic. The orientation of the linear polymers can be changed when the external field is changed, whereas the orientation of a network remains unchanged.

European Patent Application EP 313053 describes the use of a liquid crystalline material having a positive dielectric anisotropy with a transparent solid, which is present in the liquid crystalline material in the form of particles on a three-dimensional network. The network, however, is not composed of a liquid crystalline material and it is not oriented.

As described in an article by Rudolf Zentel, published in 1986, vol. 1, No. 6, pages 589–592, cross-link crystalline polymers are made to swell by using low-molecular weight nematic liquid crystal materials, so that orientation in electric fields can be brought about more readily. Two polymer materials having a different cross-linking density are used, such as 1) polyacrylate having side groups to obtain a liquid crystalline material and 2) polymethacrylate.

SUMMARY OF THE INVENTION

In accordance with the invention, a liquid crystalline material as described in the opening paragraph is obtained, which is characterized in that the polymerized material a) forms a permanently oriented network in the low-molecular weight liquid crystalline material b).

DETAILED DESCRIPTION OF THE INVENTION

Preferably, said material b) forms a continuous phase around the network of material a). This preferred continuous phase is obtained, in particular, by selecting the quantity by weight of material a) to be smaller than 50% of the sum of material a) and material b), namely between 1 and 25% by weight and more specifically between 3 and 10% by weight.

Examples of liquid crystalline material a) from which a network can be formed are acrylates, epoxy compounds, vinyl ethers and thiolene systems. Examples of acrylates are represented by formulas 1 and 2, below:

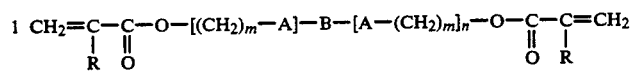

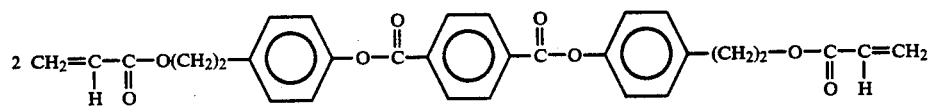

in formula 1, A denotes a carbon-to-carbon bond or —O— or —COO—, m and n denote an integer between 0 and 20, and B denotes a mesogenic group as represented by formulae 9–12 below:

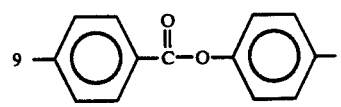

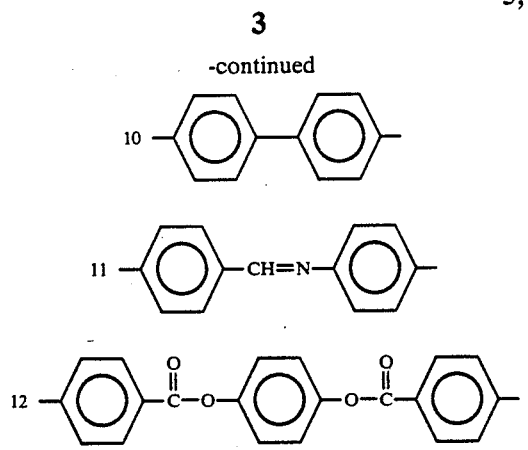

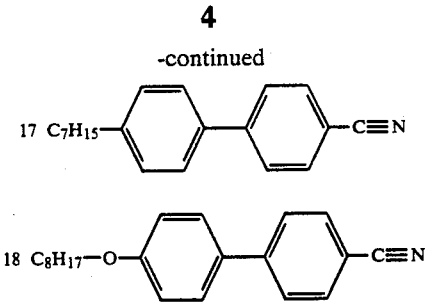

or other examples of mesogenic groups such as —N=N—, and the like, which are known to those skilled in the art. Formula 2 represents an acrylate having a mesogenic group included in the chain, said mesogenic group being represented by formula 12.

An example of an epoxy compound is shown in formula 3, below:

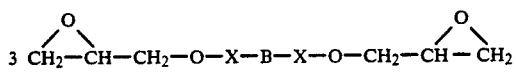

where X denotes a group having formulae 4–8, below:

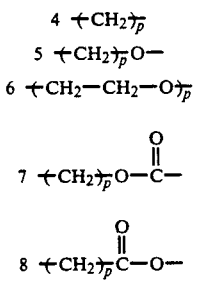

In formulae 4–8, p denotes an integer having a value of 0–20. In formula 3, B has the same meaning as in formula 1.

An example of a vinyl ether, which may be used as a starting material for the material a) according to the invention, is represented by formula 13, below:

the meaning of X and B being the same as described above with respect to formula 3.

Formulae 15–18, below:

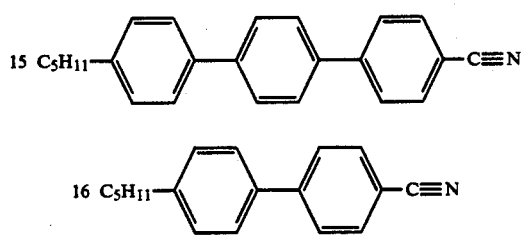

represent substances which can be used as material b), i.e. a substance which cannot be polymerized. A mixture of the compounds of formulae 15–18 is commercially available under the designation E7 from BDH, in quantities of 8%, 51%, 25% and 16%, respectively. It is alternatively possible to use a liquid crystalline material as the material b), said liquid crystalline material having polymerizable groups which do not or hardly polymerise under the conditions of polymerisation for the formation of the network consisting of substance a).

DESCRIPTION OF THE PREFERRED EMBODIMENTS

Figure 1:
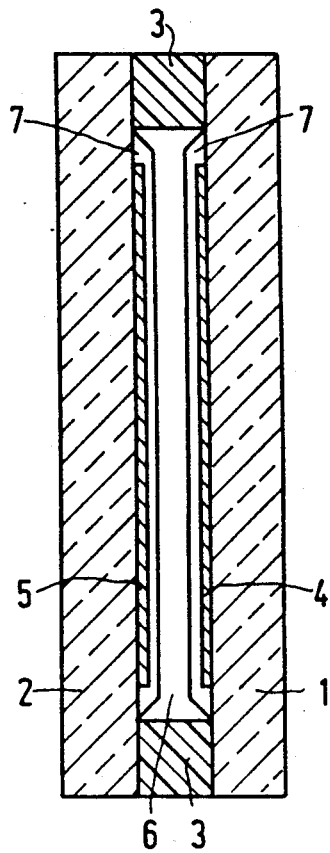
FIG. 1 is a cross-sectional view of a display cell according to the invention.

In FIG. 1, reference numerals 1 and 2 denote two opposite plates which are transparent to light and which will hereinafter be termed substrates, which support electrodes 4 and 5 on their facing sides, said electrodes also being transparent and being manufactured from, for example, $In_2O_3.SnO_2$. On the electrodes there is provided an orientation layer 7 of, for example, a polyamide or silane, by means of which the liquid crystalline material 6 according to the invention, having a positive dielectric anisotropy, can be oriented between the electrodes. The cell is manufactured by arranging a seal, for example, a ring-shaped member 3 between the substrates 1 and 2, and filling the space between the substrates and the ring 3 with liquid crystalline material 6 according to the invention. In practice, a bonding layer of an epoxy compound can be used instead of the ring 3.

When no voltage is applied to the cell, light incident on the cell is scattered to a small degree only. By applying a voltage, the gel present in the cell is subjected to an electric field and the cell becomes opaque as a result of the scattering produced in the gel.

However, it is alternatively possible to use molecules having a negative dielectric anisotropy instead of molecules having a positive dielectric anisotropy, as a result of which the switching process is reversed. When a uniaxial orientation is used, the scattered light is highly polarized and is brought about only by the presence of the network. When a voltage is applied to the cell, only a part of the free molecules are reoriented. As a result of the high degree of "anchoring", free molecules which are close to the network molecules are less influenced by the electric field generated applying the voltage.

Figure 2:
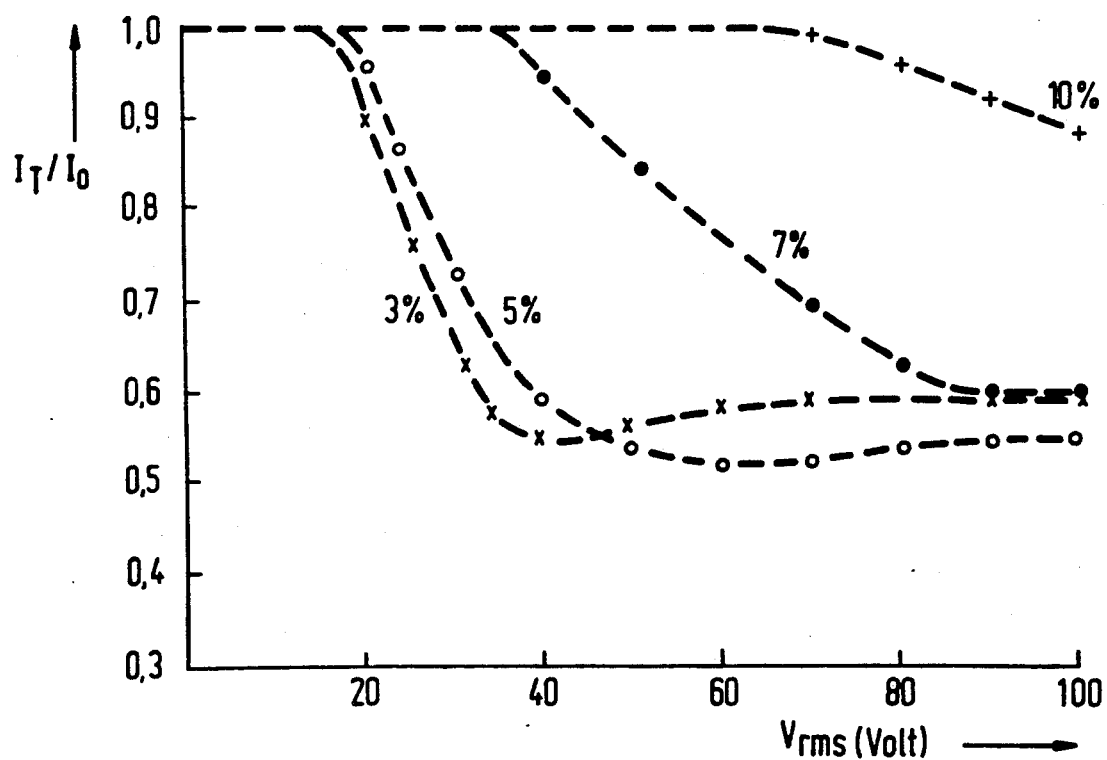
FIG. 2 is a graph showing the normalized transmitted light intensity as a function of the effective voltage applied to the cell for gels having different compositions.

As stated above, the cell is transparent when no voltage is applied. The cell becomes more opaque as the voltage increases. FIG. 2 shows the normalized transmitted light intensity $I_T/I_O$ as a function of an effective voltage $V_{rms}$ applied to a cell of 6 $\mu$m for gels containing different quantities of E7 and hence different quantities of C6H, the latter being 3%, 5%, 7% and 10%, respectively. At a low content of network molecules, the cell starts to scatter at approximately 16 volts. When applied voltages are higher, scattering rapidly reaches a saturation level, after which it decreases. Threshold voltage for bringing about scattering, however, increases rapidly as the content of network molecules increases, whereas the slope at which the saturation level is reached becomes less steep. As stated above, the higher voltages necessary to attain reorientation of the free molecules is caused by the high degree of "anchoring" which is exerted by the network molecules on the neighbouring free molecules.

Figure 3:
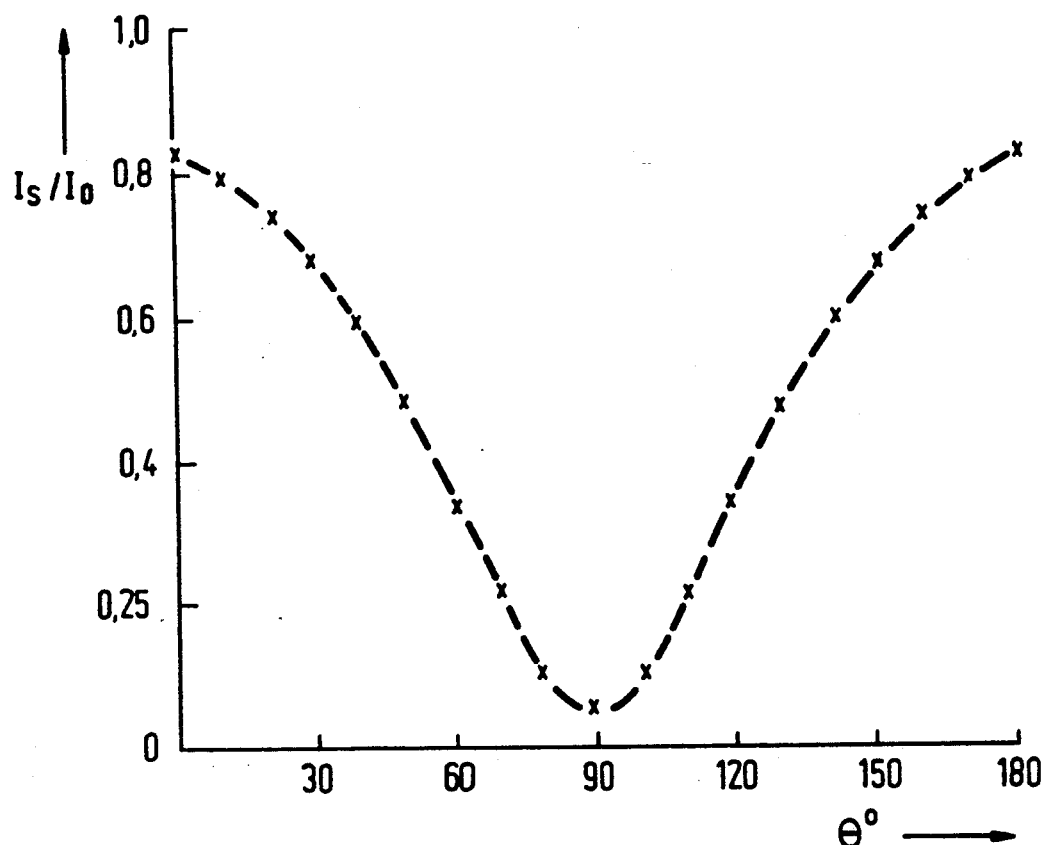
FIG. 3 is a graph showing the normalized scattered light intensity as a function of the angle between the plane of a polarization of the light incident on the cell and the direction of molecular orientation.

The effect of the direction of polarization on the intensity of the light passed is shown in FIG. 3 in terms of the scattered light intensity as a function of the angle $\theta$ between the plane of polarisation of the light incident on the cell and the direction of molecular orientation. As shown in FIG. 3, the maximum scattering is obtained when $\theta=0°$, and hardly any scattering occurs when $\theta=90°$. This means that the component of the light polarized in the direction perpendicular to the molecular orientation is passed almost without scattering. Starting from a uniaxial orientation of the gel molecules, the application of a voltage causes free molecules which are not strongly bonded to the network molecules reorient themselves in accordance with the electric field generated. The long axes of the reoriented free molecules will be inclined relative to the initial direction of molecular orientation. In the case of uniaxial orientation, scattering is maximally 50%. To attain a higher percentage of scattering, non-uniaxial orientation, such as twisted or helicoidal orientation has to be used, by employing monomers having a chiral atom or a chiral dopants.

Figure 4:
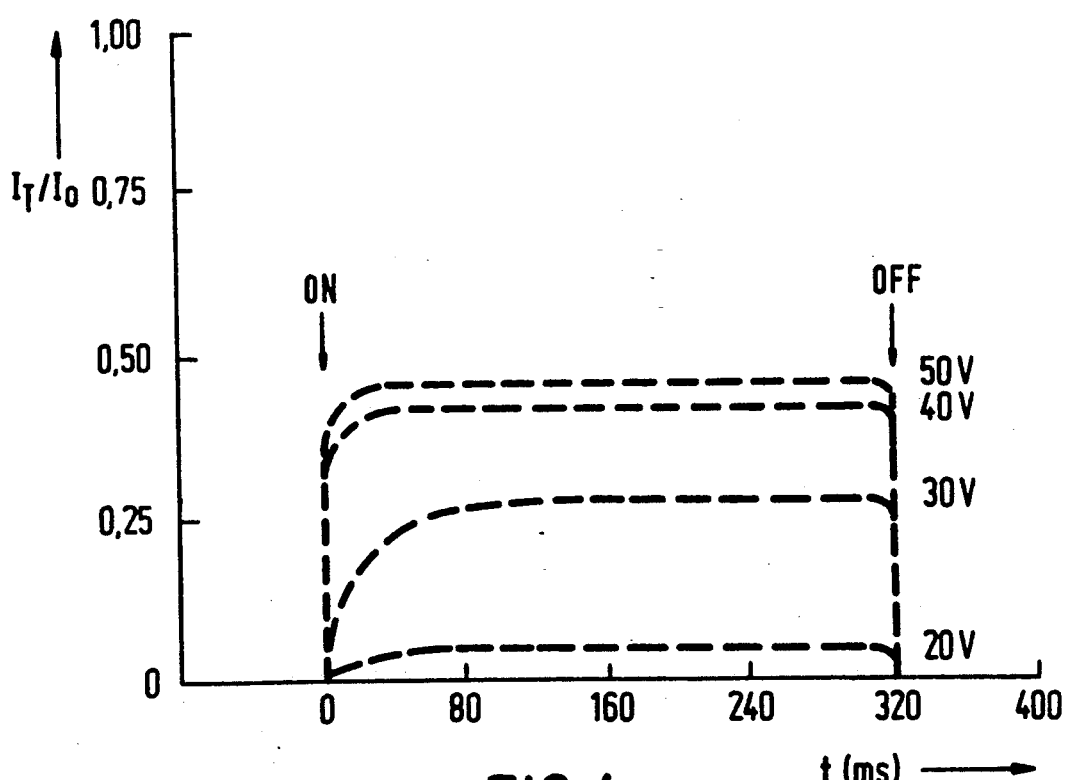
FIG. 4 is a graph showing the response of the cell comprising a gel having a specific composition for various applied voltages.

FIG. 4 shows the effect of the applied voltage on the rise time and decay time of a cell 6 $\mu$m thick and having a gel containing 95% of E7. FIG. 4 shows that the rise time decreases as the applied voltage increases, whereas the decay time remains substantially constant up to the saturation voltage and tends to increase somewhat when the voltage is increased further. Also, the rise time increases as the cell thickness increases, but the decay time remains constant. The decay time decreases rapidly as the content of network molecules increases. Consequently, it is not the thickness of the cell that counts, but the average distance between the network molecules. This explains the relatively short decay times in comparison with the decay times (a few hundred milliseconds) of normal nematic cells. More particularly, decay times of less than one millisecond can be obtained.

The above-mentioned scattering properties of the gel can of course be used in many other opto-electronic devices, such as shutters.

The invention will be explained in more detail in the following example of eh preparation of a liquid crystalline material according to the invention.

EXAMPLE

A display cell was composed of two opposite plates which are transparent to light and which are provided with transparent electrodes and with rubbed polyimide orientation layers. In the cell was a liquid crystalline material consisting of the materials a) and b), for which purpose 5% of diacrylate was used, represented by formula 14 (known by the designation C6H), which diacrylate was added to 95 parts of a liquid crystalline material, marketed by BDH and known as E7, consisting of a mixture of four substances, represented by formulae 15-18. Irgacure 651, a photo-initiator marketed by Ciba Geigy in a quantity of 1 part by weight was added to said mixture. The placement of the liquid crystalline material between the plates takes place by capillarity (under the influence of the surface tension). The orientation obtained for the liquid crystalline material corresponds with the direction in which the polyimide was rubbed. After said orientation, the liquid crystalline material was exposed to UV light (TLO9-Philips), so that a network or skeleton was formed on the basis of the diacrylate which is represented by formula 14, which network was present in the continuous phase of the material b) and acted to preserve the orientation independent of the fields applied and the influences to which the liquid crystalline material b) was subjected.

We claim:

1. A liquid crystalline material in the form of an anisotropic gel consisting of a polymerized liquid crystalline material a) and a non-polymerizable low-molecular weight liquid crystalline material b), characterized in that the polymerized material a) forms a permanently oriented network in the non-polymerizable low-molecular weight liquid crystalline material b).

2. A liquid crystalline material as claimed in claim 1, characterized in that material b) forms a continuous phase around the network of material a).

3. A liquid crystalline material as claimed in claim 1, characterized in that material a) is selected from the group consisting of acrylates, epoxy compounds, vinyl ether compounds and thiolene compounds.

4. A liquid crystalline material as claimed in claim 3, characterized in that the acrylates correspond to the formula

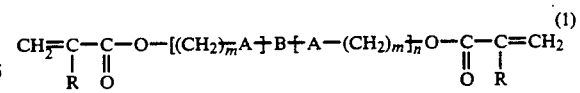

where A is a carbon-to-carbon bond, —O—, COO—, B is a mesogenic group, and m and n are integers between 0 and 20.

5. A liquid crystalline material as claimed in claim 3, characterized in that the epoxy compounds correspond to the formula

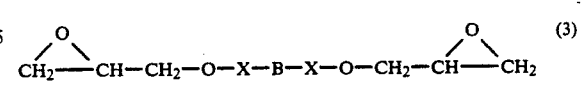

where X is a moiety of a formula selected from the group consisting of the formula

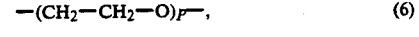

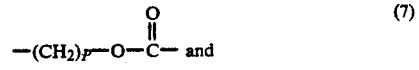

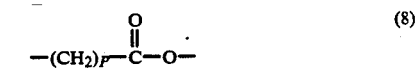

B is a mesogenic group, and p is an integer of 0–20.

6. A liquid crystalline material as claimed in claim 3 characterized in that the material a) is a vinyl ether of the formula

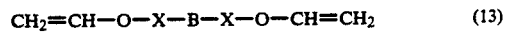

and x is a moiety of a formula selected from the group consisting of the formulae

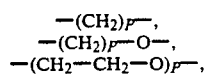 (4)
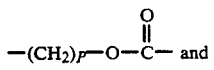 (5)
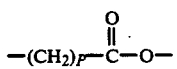 (6)

$$-(CH_2)_P-O-\overset{O}{\underset{\|}{C}}- \text{ and} \qquad (7)$$

$$-(CH_2)_P-\overset{O}{\underset{\|}{C}}-O- \qquad (8)$$

wherein P is an integer of 0–20.

7. A liquid crystalline material as claimed in claim 1, characterized in that material a) is present in the gel in a quantity of less than 50% by weight.

8. A liquid crystalline material as claimed in claim 7, characterized in that the material a) is present in the gel in a quantity of 1–25% by weight.

9. A liquid crystalline material as claimed in claim 8, characterized in that the material a) is present in the gel in a quantity of 3–10% by weight.

10. A liquid crystalline material as claimed in claim 1, characterized in that under the conditions of cross-linking substance a), substance b) is a non-polymerizable liquid crystalline material.

11. A liquid crystalline material as claimed in claim 1, characterized in that substance b) is at least one selected from the group of compounds represented by

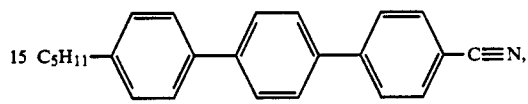

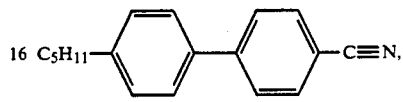

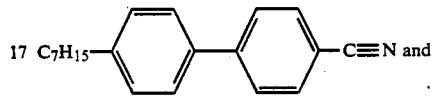

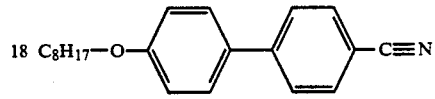

12. A liquid crystalline material as claimed in claim 1, characterized in that the permanently oriented network is helically shaped.

13. A liquid crystalline material as claimed in claim 4, characterized in that the mesogenic group has a formula selected form the group consisting of the formula

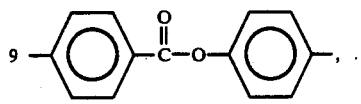

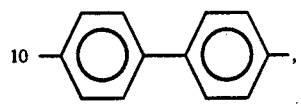

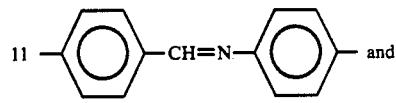

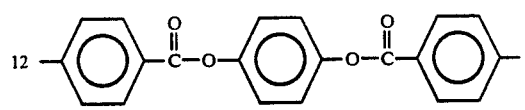

14. A liquid crystalline material as claimed in claim 5, characterized in that the mesogenic group has a formula selected form the group consisting of the formula

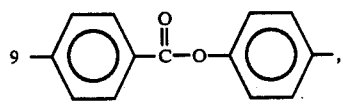

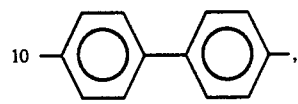

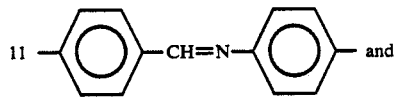

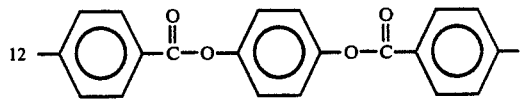

15. A liquid crystalline material as claimed in claim 6, characterized in that the mesogenic group has a formula selected form the group consisting of the formula

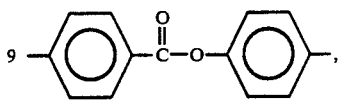

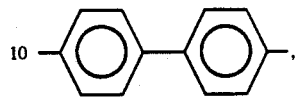

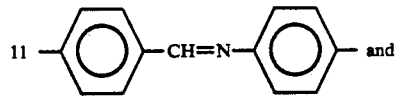

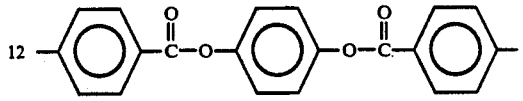

16. A liquid crystalline material as claimed in claim 2, characterized in that the material a) is present in the gel in a quantity of less than 50% by weight.

17. A liquid crystalline material as claimed in claim 3, characterized in that material a) is present in the gel in a quantity of less than 50% by weight.

18. A liquid crystalline material as claimed in claim 4, characterized in that the material a) is present in the gel in a quantity of less than 50% by weight.

19. A liquid crystalline material as claimed in claim 5, characterized in that the material a) is present in the gel in a quantity of less than 50% by weight.

20. A liquid crystalline material as claimed in claim 6, characterized in that material a) is present in the gel in a quantity of less than 50% by weight.

21. A liquid crystalline material as claimed in claim 13, characterized in that material a) is present in the gel in a quantity of less than 50% by weight.

22. A liquid crystalline material as claimed in claim 14, characterized in that material a) is present in the gel in a quantity of less than 50% by weight.

23. A liquid crystalline material as claimed in claim 15, characterized in that material a) is present in the gel in a quantity of less than 50% by weight.

24. A display cell comprising two opposite plates which are transparent to light electrodes of a material which is transparent to light on the sides of the plates facing each other, orientation layers on the electrodes, a sealing material between the plates, and a liquid crystalline material in the space between the plates and the sealing material, characterized in that the liquid crystalline material is composed of at least two different liquid crystalline materials, as claimed in claim 1.

* * * * *